United States Patent
Dye, Jr. et al.

(10) Patent No.: US 12,458,371 B2
(45) Date of Patent: Nov. 4, 2025

(54) INSERTER WITH A TELESCOPING REFERENCE FOOT

(71) Applicant: Zimmer, Inc., Warsaw, IN (US)

(72) Inventors: Donald W. Dye, Jr., Warsaw, IN (US); Kyle A. Bohnenkamper, Warsaw, IN (US)

(73) Assignee: Zimmer, Inc., Warsaw, IN (US)

( * ) Notice: Subject to any disclaimer, the term of this patent is extended or adjusted under 35 U.S.C. 154(b) by 520 days.

(21) Appl. No.: 17/870,355

(22) Filed: Jul. 21, 2022

(65) Prior Publication Data

US 2023/0055628 A1  Feb. 23, 2023

Related U.S. Application Data

(60) Provisional application No. 63/234,491, filed on Aug. 18, 2021.

(51) Int. Cl.
*A61B 17/16* (2006.01)
*A61B 17/00* (2006.01)

(52) U.S. Cl.
CPC ...... *A61B 17/1659* (2013.01); *A61B 17/1668* (2013.01); *A61B 2017/0046* (2013.01)

(58) Field of Classification Search
CPC ............ A61B 17/1659; A61B 17/1668; A61B 17/1735; A61F 2/4607
See application file for complete search history.

(56) References Cited

U.S. PATENT DOCUMENTS

2014/0276850 A1\* 9/2014 Chaney .................. A61F 2/461
606/84

\* cited by examiner

*Primary Examiner* — Olivia C Chang
(74) *Attorney, Agent, or Firm* — SCHWEGMAN LUNDBERG & WOESSNER, P.A.

(57) ABSTRACT

Disclosed herein are reference feet for inserters and method of use thereof. The reference feet can include a body, a tine, a first arm, and a first base. The body can have a longitudinal axis and define an engagement fixture oriented parallel to the longitudinal axis and sized to receive a complementary fixture of an inserter. The tine can extend from the body along the longitudinal axis and including a protuberance sized to engage a stop of the inserter. The first arm can extend from the body. The first base can be attached to the first arm and have a planar surface arranged at an angle relative to the longitudinal axis.

17 Claims, 8 Drawing Sheets

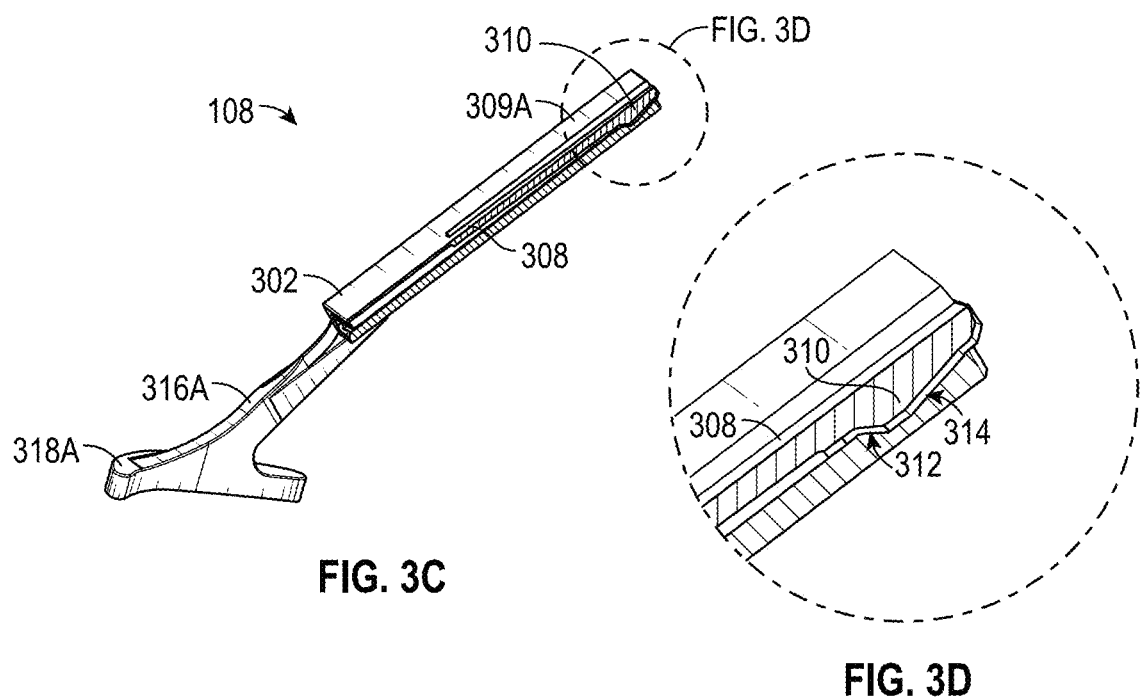
FIG. 3C
FIG. 3D
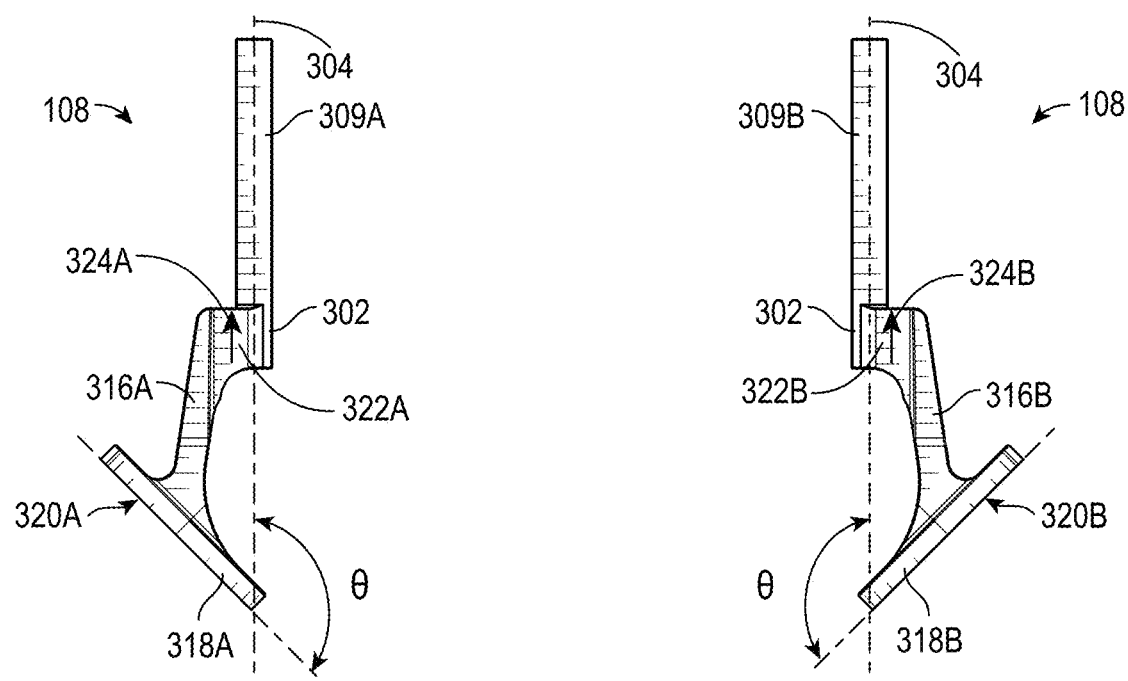
FIG. 3E
FIG. 3F

INSERTER WITH A TELESCOPING REFERENCE FOOT

CLAIM OF PRIORITY

This application claims the benefit of U.S. Provisional Patent Application Ser. No. 63/234,491, filed on Aug. 18, 2021, the benefit of priority of which is claimed hereby, and which is incorporated by reference herein in its entirety.

FIELD OF THE DISCLOSURE

The present disclosure relates generally to surgical instruments and use thereof. More specifically, the present disclosure relates to inserter handles and methods of use thereof.

BACKGROUND

During various surgical procedures, a rasp can be used to prepare a bone to receive an implant. For example, during a hip arthroplasty procedure a stem can be implanted into a femur. However, before the stem can be implanted, a rasp can be used to prepare the femoral canal. The rasp can be removably connected to a rasp handle. By having the rasp be removably connected to the rasp handle, different rasps each having a different size and/or roughness can be connected to the rasp handle.

SUMMARY

The following, non-limiting examples, detail certain aspects of the present subject matter to solve the challenges and provide the benefits discussed herein, among others.

Example 1 is a reference foot comprising: a body having a longitudinal axis, the body defining an engagement fixture sized to receive a complementary fixture of an inserter; a tine extending from the body along the longitudinal axis and including a protuberance sized to engage a stop of the inserter; a first arm extending from the body; and a first base attached to the first arm and having a planar surface arranged at an angle relative to the longitudinal axis.

In Example 2, the subject matter of Example 1 optionally includes at least one stop protruding from a portion of the body, the at least one stop sized to engage a corresponding stop of the inserter so as to limit movement of the reference foot relative to the body in a first direction.

In Example 3, the subject matter of any one or more of Examples 1-2 optionally include wherein the protuberance of the tine comprises: a first surface arranged at a first angle relative to the longitudinal axis, and a second surface arranged at a second angle relative to the longitudinal axis, the first angle being larger than the second angle.

In Example 4, the subject matter of any one or more of Examples 1-3 optionally include wherein the tine is flexible.

In Example 5, the subject matter of any one or more of Examples 1-4 optionally include wherein the engagement fixture includes a channel sized to receive a rail portion of the inserter.

In Example 6, the subject matter of any one or more of Examples 1-5 optionally include wherein the first base is rotatably attached to the first arm such that the angle relative to the longitudinal axis is adjustable.

In Example 7, the subject matter of any one or more of Examples 1-6 optionally include a second arm extending from the body, and a second base attached to the second arm and having a planar surface arranged at the angle relative to the longitudinal axis.

Example 8 is a system for rasping a bone, the system comprising: an inserter comprising: an inserter body having a longitudinal axis, and a first engagement fixture arranged parallel to the longitudinal axis of the inserter body and including an inserter stop; and a reference foot comprising: a reference foot body having a longitudinal axis, the reference foot body defining a second engagement fixture oriented parallel to the longitudinal axis of the reference foot body and sized to engage the first engagement fixture of the inserter, a tine extending from the body along the longitudinal axis of the reference foot body and including a tine protuberance sized to engage the inserter stop, a first arm extending from the reference foot body, and a first base attached to the first arm and having a planar surface arranged at an angle relative to the longitudinal axis of the reference foot body.

In Example 9, the subject matter of Example 8 optionally includes wherein the inserter includes an inserter stop projecting from the inserter body; and the reference foot includes a reference foot stop protruding from the reference foot body, the inserter stop and the reference foot stop cooperative to limit movement of the reference foot relative to the inserter body in a first direction along the longitudinal axis of the inserter.

In Example 10, the subject matter of any one or more of Examples 8-9 optionally include wherein the tine protuberance comprises: a first surface arranged at a first angle relative to the longitudinal axis, and a second surface arranged at a second angle relative to the longitudinal axis, the first angle being larger than the second angle, and the inserter stop comprises complementary first and second angles.

In Example 11, the subject matter of any one or more of Examples 8-10 optionally include wherein the tine is flexible.

In Example 12, the subject matter of any one or more of Examples 8-11 optionally include wherein the first engagement fixture includes a rail portion and the second engagement fixture includes a channel sized to receive the rail portion.

In Example 13, the subject matter of any one or more of Examples 8-12 optionally include wherein the first base is rotatably attached to the first arm such that the angle relative to the longitudinal axis of the reference foot is adjustable.

In Example 14, the subject matter of any one or more of Examples 8-13 optionally include wherein the reference foot further comprises: a second arm extending from the body; and a second base attached to the second arm and having a planar surface arranged at the angle relative to the longitudinal axis of the reference foot.

In Example 15, the subject matter of any one or more of Examples 8-14 optionally include wherein the reference foot is one of a plurality of reference feet, the angle of each of the reference feet being different than the others.

Example 16 is a system for reaming a bone, the system comprising: a rasp; an inserter comprising: an inserter body having a first end, a second end, and a longitudinal axis extending from the first end to the second end, the first end operable to engage the rasp, the second operable to engage a strike plate, a rail arranged parallel to the longitudinal axis of the inserter body and including an indentation, and an inserter stop projecting from the inserter body; and a reference foot comprising: a reference foot body having a longitudinal axis parallel to the longitudinal axis of the inserter body when the reference foot is attached to the inserter, the reference foot body defining a channel oriented parallel to the longitudinal axis of the reference foot body and sized to engage the rail of the inserter, a tine extending from the body along the longitudinal axis of the reference foot body and including a protrusion sized to engage the indentation of the rail of the inserter, a first arm extending from the reference foot body, a first base attached to the first arm and having a planar surface arranged at an angle relative to the longitudinal axis of the reference foot body, a second arm extending from the body, a second base attached to the second arm and having a planar surface arranged at the angle relative to the longitudinal axis of the reference foot, and a reference foot stop protruding from the reference foot body, wherein the inserter stop and the reference foot stop cooperative to limit movement of the reference foot relative to the inserter body in a first direction along the longitudinal axis of the inserter.

In Example 17, the subject matter of Example 16 optionally includes wherein the tine is flexible.

In Example 18, the subject matter of any one or more of Examples 16-17 optionally include wherein the first base is rotatably attached to the first arm such that the angle relative to the longitudinal axis of the reference foot is adjustable.

In Example 19, the subject matter of any one or more of Examples 16-18 optionally include wherein the protuberance of the tine comprises: a first surface arranged at a first angle relative to the longitudinal axis, and a second surface arranged at a second angle relative to the longitudinal axis, the first angle being larger than the second angle, and the inserter stop comprises complementary first and second angles.

In Example 20, the subject matter of any one or more of Examples 16-19 optionally include wherein the reference foot is one of a plurality of reference feet, the angle of each of the reference feet being different than the others.

In Example 21, the reference foot or any systems of any one or any combination of Examples 1-20 can optionally be configured such that all elements or options recited are available to use or select from.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIGS. 3A-3J each shows a reference foot in accordance with at least one example of this disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1A:
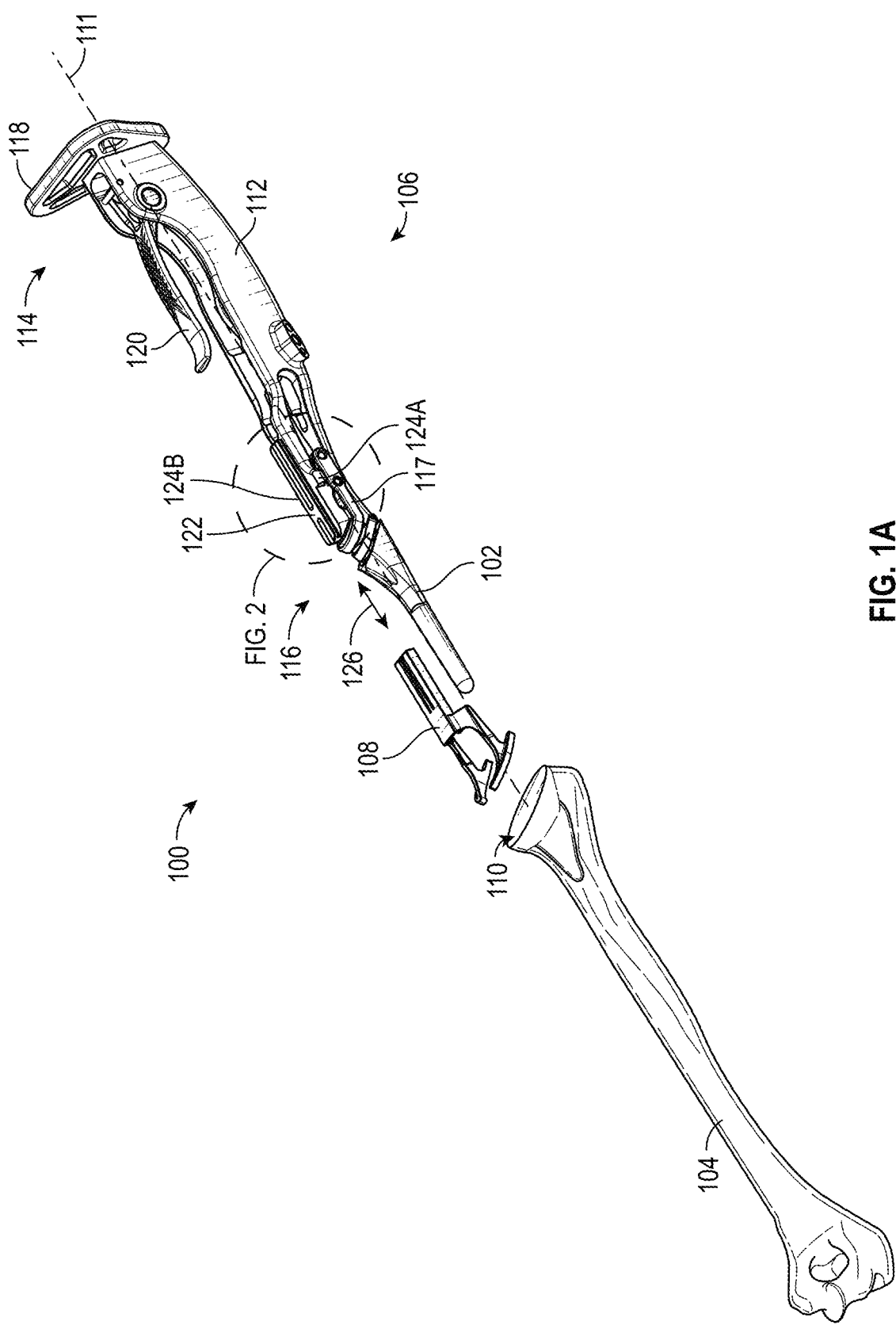
FIGS. 1A and 1B each illustrates a system in accordance with at least one example of this disclosure.

During arthroplasty procedures involving a long bone, such as a femur or humerus, there can be a need for a surgeon to accurately control a depth of insertion as well as simultaneously control the version (e.g., rotation angle) during rasping the femoral or humeral canal. Further, there can be a need for the surgeon to accurately replicate the same depth and version when the final implant is installed in a canal of the long bone. Currently, these two separate processes, rasping and implanting, rely on the skill and dexterity of the surgeon for a consistency and good patient outcome. Even more surgical skill is required for an optimum patient outcome. Current rasp and stem inserters rely on simple visual landmarks to help the surgeon achieve these goals.

The systems and methods disclosed herein provide both a combination of positive mechanical stops and visual cues to assist the surgeon with rasping and implanting without requiring active intervention by the surgeon to use the devices. Depth control and retroversion can be simultaneously set before the rasp or stem is fully seated, and both depth and retroversion can be controlled from the time the inserter instruments are placed in the wound until they are finally and fully seated. When the devices are used on a rasp inserter, the devices reset themselves automatically between successive rasps without manipulation by the surgeon or an assistant.

The systems and methods disclosed herein are modular and can telescope from a first, or starting, position wherein the rasp and stem are raised above a resection, such as a humeral or femoral resection, and retract to a second, or fully seated position, as the inserting and rasping processes continue. Version as well as depth can be controlled in a repeatable, accurate manner simultaneously throughout the entire rasping and stem insertion process.

A reference foot disclosed herein can be removably attached to each of the inserters and stay attached throughout the rasping and/or implant insertion process. The reference foot can telescope freely up and down throughout the entire rasping and/or stem insertion processes and can then be intentionally removed. The same reference foot part can be swapped between the rasp inserter and stem inserter seamlessly so that the same reference foot with the same behavior and same surgeon view and wound access can be achieved in and throughout each separate process. This contributes to consistent surgical results.

The reference feet disclosed herein can be manufactured in a variety of widths to accommodate a wide range of bone sizes. The reference feet can also come in a variety of fixed resection angles and/or can include options for a variable resection angle.

The reference feet disclosed herein can be modular parts that can be attached and/or removed from mating inserters as needed. For example, the reference feet can slide on one or more rails that control version and depth of the rasp or stem implant that is attached to the inserter.

Retention of the reference feet disclosed herein on the inserter can be achieved via mechanical connections that can be rigid or deformable. For example, retention of a reference foot on the inserter can be accomplished using an elastically deformable tine, sometimes referred to as a spring finger. Once attached, the tine can hinder and/or prevent the reference foot from separating from the inserter and/or being inadvertently removed.

As disclosed herein, a reference foot can slide to an extended position under gravity and stop when a protuberance, such as a protrusion, of the tine rests on and/or in a stop of an inserter body. For example, a stop feature machined into the inserter body can engage a protrusion of the tine to keep the reference foot from sliding off the inserter body. In another example, a protrusion of the inserter body can engage a stop feature of the tine or body of the reference foot to keep the reference foot from sliding off the inserter body.

As the surgeon places the rasp/rasp inserter/reference foot assembly into an entrance of a resected/reamed bone, a surface of one or more bases of the reference foot can contact the resection plane of the bone. As a result of the base contacting the resected bone, the surgeon can visually determine whether the surfaces on the reference foot rests flat against the resection or not. Based on the visual determination, the surgeon can immediately adjust the position of the rasp inserter or stem inserter so that the surfaces rest equally and flush against the resection surface before the first hammer blow is struck. As the surgeon begins hammering the rasp or stem implant down into the bone, (s)he can constantly be aware of any adverse shift in position and correct any positional errors before the next hammer blow.

Using the reference feet disclosed herein, the surgeon can release his or her grip on the inserter and place a thumb and/or forefinger on the base of the reference foot to hold the reference foot flush against the resection while hammering. Because fingertips are sensitive enough to detect in real time misalignment, small or large, of the reference foot base against the resection surface and strong enough to hold the reference foot in place, misalignments can be prevented with one hand while the other hand delivers the hammer blows until the rasp or stem implant is fully seated.

As the rasp or stem implant is hammered into the bone, the reference foot can remain in constant contact with the resected surface of the bone and the reference foot can telescope upon guide rails of the inserter. Stated another way, surgeon intervention is not needed to advance the reference foot along the guide rails of the inserter during use. The surgeon can see the progress of the rasp or stem implant downwards into the bone with each hammer blow, until depth stops indicate the intended depth has been reached. To improve the surgeon's visibility of a proximal portion of the bone (e.g., the proximal humerus, intertrochanteric line of the femur, etc.) and the rasp's or stem implant's progress down a canal of the bone, a gap in between the bases of the reference foot can be defined for visualizing insertion progress.

When the intended seating depth is reached, mechanical stops, which can be integral to both the reference feet and the inserter bodies, can stop the rasp and/or stem implant from advancing further. These features can provide a solid stop to reduce and/or prevent the likelihood of excessive seating depth for both rasp and stem implant. Further, there can be a change in the tone heard by the surgeon when the stop features engage and load the reference foot solidly against the resected surface of the bone. This can also be felt by the surgeon if (s)he has a thumb and/or forefinger resting on the base of the reference foot.

Consistent with embodiments disclosed herein, opposing arrows can be engraved into the faces of the stop features on the reference foot and inserter body. These arrows can provide visual assurance that the intended seating depth has or has not been achieved during surgery. These arrows can be placed so that they can be easily seen in either a right-hand or left-hand patient surgery. When the arrows appear to be "tip-to-tip," the mechanical stops have simultaneously engaged and the intended insertion depth has been reached.

During rasping, several different size rasps can be used, progressing one-by-one from a smaller rasp, to the final sized rasp. Each rasp in turn can be placed at its correct version and depth relative to the resected surface of the bone. As the first rasp is removed, and as each of the intermediate rasps are removed from the bone, the reference foot can reset itself by gravity to a first, or extended position, and stay there while the inserter/rasp assembly is again placed in the bone. This automatic reset of the reference foot position on the inserter can be accomplished without requiring a surgeon or assistant to reassemble or manipulate the reference foot. The inserter/reference foot/rasp assembly is again ready to proceed with bone preparation with the next size rasp, and so on until the final rasp is used.

The reference feet disclosed herein do not interfere with the disconnection or subsequent reconnection and removal of the rasp inserter with the final, seated rasp before or after the trialing portion of the surgery. The reference feet also do not interfere with the disconnection (or subsequent reconnection, if desired) of the stem implant inserter from the final, seated stem implant during that portion of the surgery.

Still consistent with embodiments disclosed herein, for use with a variable angle resection implant, the reference foot can have a fixed "chevron" shape to the base. This shape can accommodate a range of resection angles, with the central resection angle defined as a cylindrical radius set to be tangent to the maximum and minimum resection angle faces on the medial and/or lateral faces of the base. The reference foot also can have a movable, pivoting base that can allow accurate version and depth control over a range of resection angles.

The above discussion is intended to provide an overview of subject matter of the present patent application. It is not intended to provide an exclusive or exhaustive explanation of the invention. The description below is included to provide further information about the present patent application.

Figure 1B:
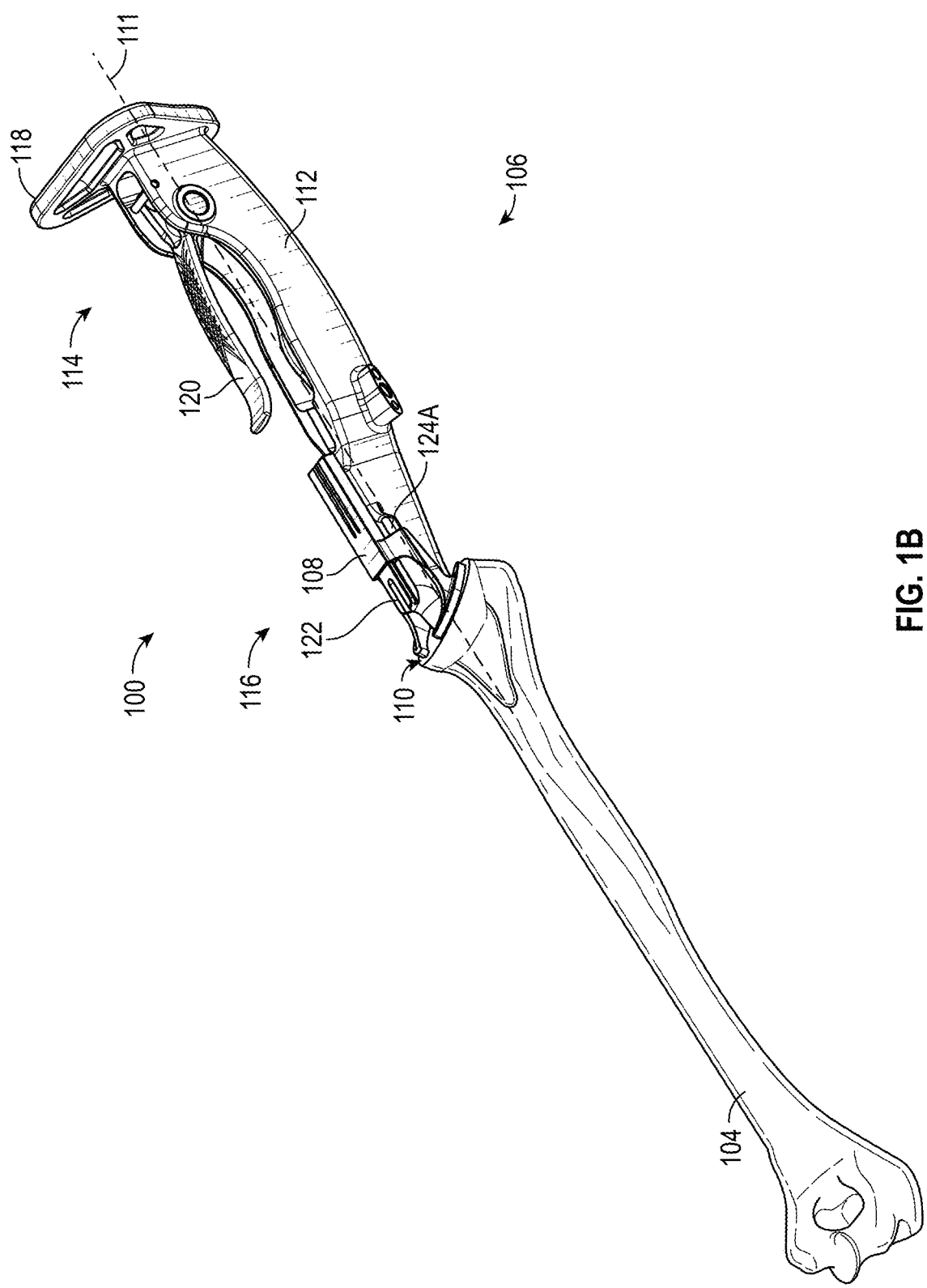

Turning now to the figures, FIGS. 1A and 1B each illustrates a system 100 for inserting a stem and/or rasp (collectively referred to as a rasp 102 throughout this disclosure) into a bone 104. System 100 can include an inserter 106 and a reference foot 108. As disclosed herein system 100 can be used to insert rasp 102, or various rasps of different sizes, into a resected surface 110 of bone 104 in a repeatable and consistent manner.

Inserter 106 can include an inserter body 112 having a longitudinal axis 111 that extends from a first end 114 and a second end 116. A strike plate 118 and a lever 120 can be located at first end 114. Rasp 102 can be connected to inserter body 112 at second end 116 via a linkage 117 connected to lever 120 and inserter body 112. During surgery, a surgeon can secure rasp 102 to inserter 106 using lever 120 and impact strike plate 118 with a hammer or other blunt instrument to drive rasp 102 into bone 104.

Figure 2:
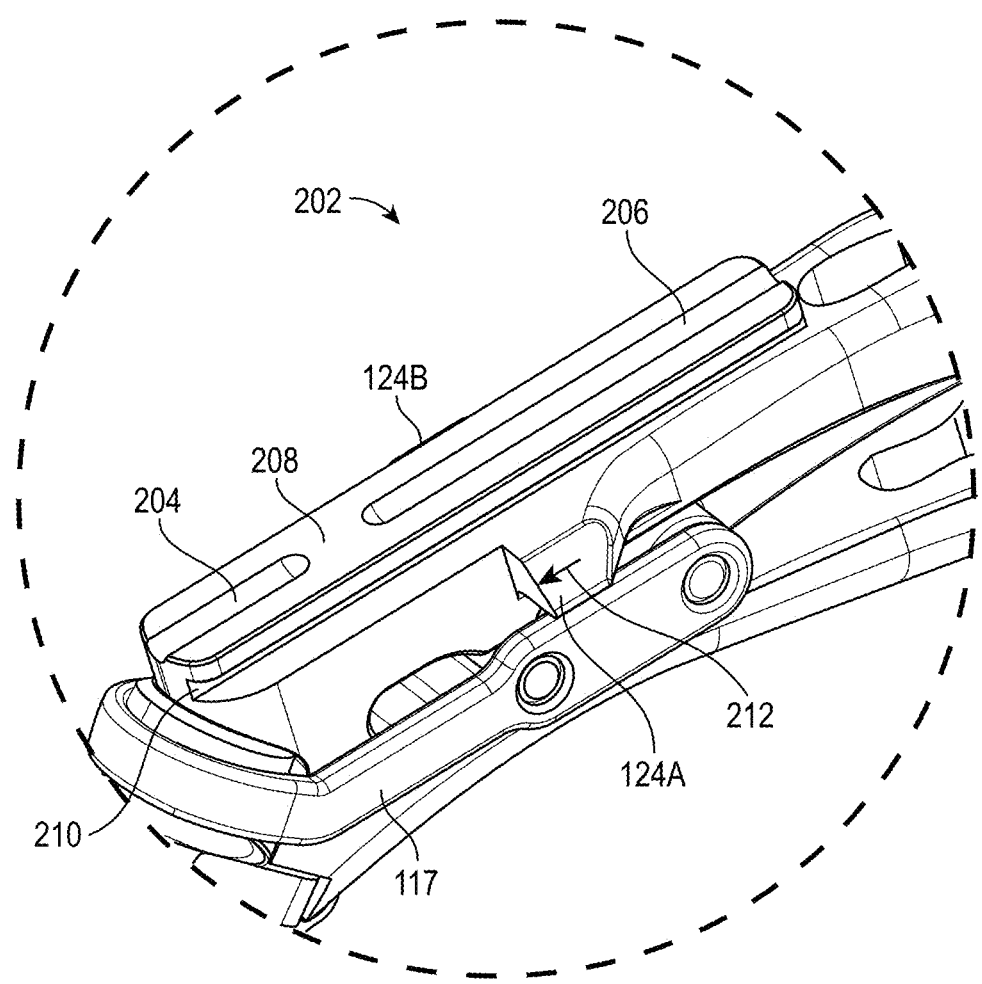
FIG. 2 shows a detail of the system of FIGS. 1A and 1B in accordance with at least one example of this disclosure.
Figure 3A:
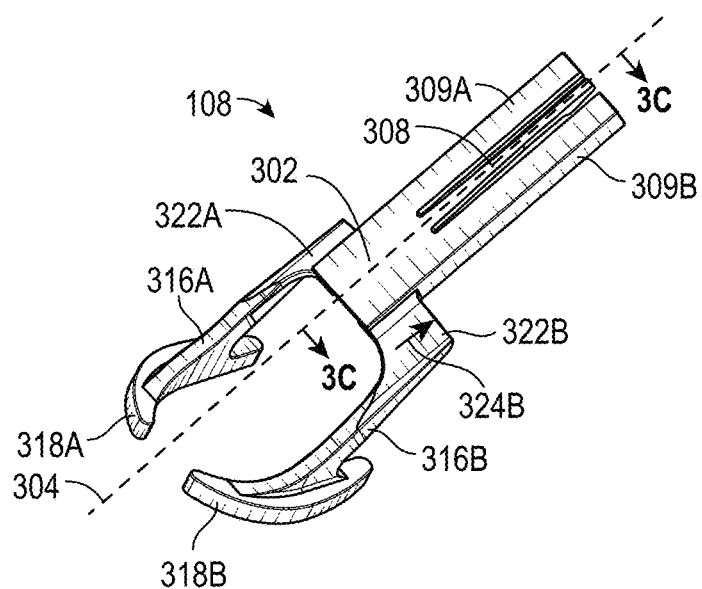
Figure 3B:
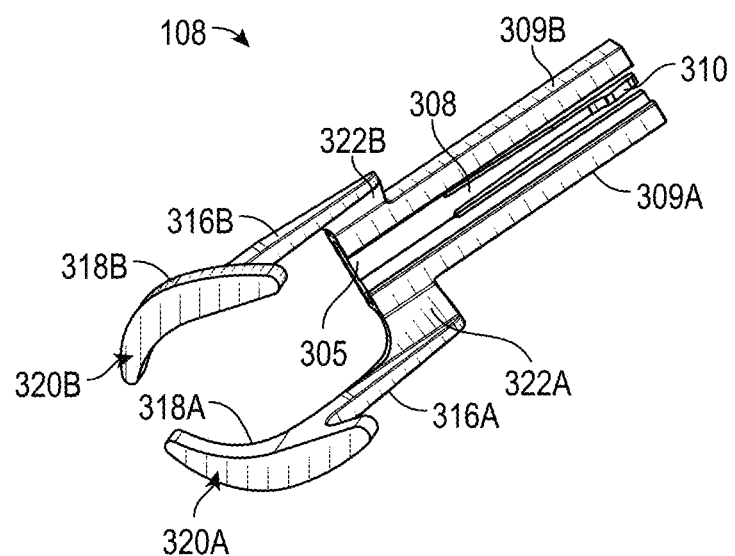
Figure 3G:
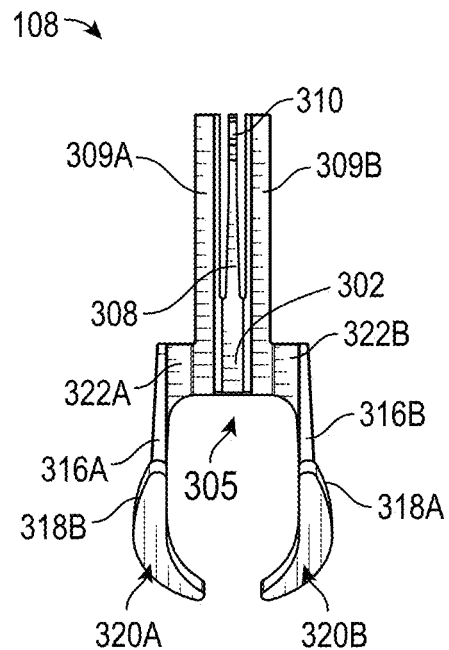
Figure 3H:
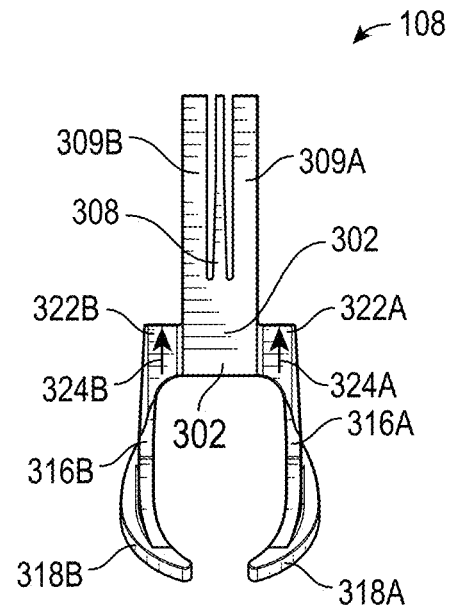
Figure 3I:
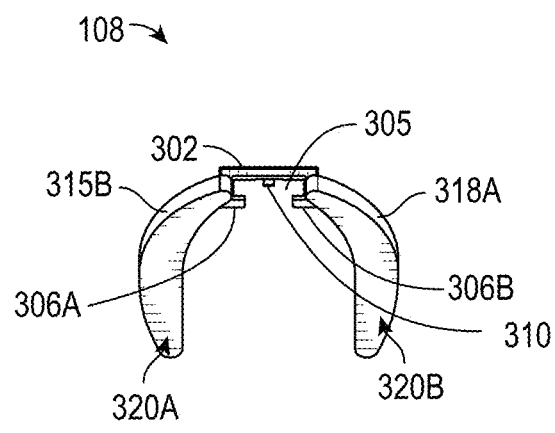
Figure 3J:
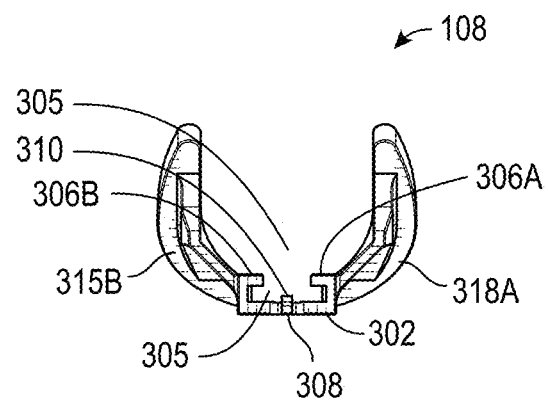

Inserter body 112 can also include a first engagement fixture arranged parallel to longitudinal axis 111 of inserter body 112. For instance, the first engagement fixture may be a rail 122 located at second end 116 proximate rasp 102. Rail 122 can be arranged parallel to longitudinal axis 111 of inserter body 112 and including an indentation 202 (see FIG. 2). As shown in FIG. 2, indentation 202 can be divided into a first portion 204 and a second portion 206 by an inserter stop 208. Inserter stop 208 can be a portion of rail 122 that remains after indention 202 is machined into inserter body 112. Inserter stop 208 can also be added after formation of indentation 202 using additive manufacturing techniques such as welding, braising, and 3D printing.

Inserter body 112 can also include one or more inserter stops 124 (labeled individually as stops 124A and 124B). As disclosed herein, inserter stops 124 may engage corresponding stops, described below, of reference foot 108 to limit a depth in which rasp 102 can be inserted into bone 104. As shown in FIG. 2, inserter body 112 can include one or more arrows 212. Arrows 212 may be engraved or otherwise etched into inserter stops 124. As disclosed herein, arrows 212 can be placed so that they can be easily seen in either a right-hand or left-hand patient surgery. Arrows 212 appearing to be "tip-to-tip" with corresponding arrows 324 on reference foot 108 can indicate inserter stops 124 have engaged reference foot stops 322 as disclosed herein, thereby indicating that the intended insertion depth has been reached.

As disclosed herein, reference foot 108 and rail 122 can form an engagement fixture. During used, reference foot 108 can translate along rail 122. For example, rail 122 can be oriented along longitudinal axis 111 of inserter body 112 and reference foot 108 can travel in a direction parallel to longitudinal axis 111 of inserter body 112 during use as indicated by arrow 126.

FIGS. 3A-3I each shows reference foot 108 in accordance with at least one example of this disclosure. Reference foot 108 can have a reference foot body 302 having a longitudinal axis 304, which can be parallel to longitudinal axis 111 of inserter body 112 when reference foot 108 is attached to inserter body 112. Reference foot body 302 can define a channel 305, which can be oriented parallel to longitudinal axis 304 of reference foot body 302 and sized to engage rail 122. For example, as shown in FIG. 2, rail 122 can define a groove 210. A corresponding groove can be located on the opposite side of rail 122. Channel 305 can include lips 306 (labeled individually as lip 306A and 306B) that can ride in grooves, such as groove 210 when reference foot 108 is connected to rail 122.

A tine 308 can extend from reference foot body 302 along longitudinal axis 304 of reference foot body 302. Tine 308 can include a protrusion 310. Protrusion 310, sometimes referred to as a protuberance, can be sized to engage indentation 202 of rail 122. For example, as reference foot 108 is connected to rail 122, protrusion 310 can first engage or ride in first portion 204 of indentation 202. Upon contacting inserter stop 208, tine 308, which may be flexible, may elastically deform to allow protrusion 310 to pass over inserter stop 208. Protrusion 310 may then rest in second portion 206 of indentation 202 to secure reference foot 108 to inserter body 112.

As disclosed herein inserter stop 208 can act as a stop to limit movement of reference foot 122 in a first direction. For example, inserter stop 208 can act as a stop to limit movement of reference foot 108 in a direction toward second end of 116 of inserter body 112 to prevent reference foot 108 from inadvertently becoming separated from rail 122. Extensions 309 (labeled individually as extensions 309A and 309B) can extend from reference foot body 302 along each side of tine 308. Extensions 309 can protect tine 308 to prevent bending or other deformation in a lateral direction. In other words, extensions 309 can prevent tine 308 from being bent so as to not line up with indentation 202.

As shown in FIG. 3D, protrusion 310 can include a first surface 312 and a second surface 314. First surface 312 can be arranged at a first angle relative to longitudinal axis 304 and second surface 314 can be arranged at a second angle relative to longitudinal axis 304. Inserter stop 208, sometimes referred to as an inserter protuberance, can include complementary surfaces to first and second surfaces 312 and 314. The complementary surfaces can be arranged relative to longitudinal axis 304 at angles similar to the first and second angles of first and second surfaces 312 and 314.

The first angle can be larger than the second angle. By having the first angle be larger than the second angle, as well as incorporation of the complementary surfaces of inserter stop 208, attaching reference foot 108 to rail 122 can require less effort than removing reference foot 108 from rail 122. Stated another way, the larger angle of first angle minimizes reference foot 108 inadvertently detaching from rail 122, while still allowing reference foot 108 to easily be connected to rail 122.

Reference foot 108 can also include one or more arms 316 (labeled individually as arms 316A and 316B) that extend from reference foot body 302. Bases 318 (labeled individually as bases 318A and 318B) can be attached to arms 316. Bases 318 can include surfaces 320 (labeled individually as surfaces 320A and 320B) that are arranged at an angle θ relative to longitudinal axis 304. Since longitudinal axis 304 is parallel to longitudinal axis 111 when reference foot 108 is attached to rail 122, surfaces 320 are also arranged at angle θ relative to longitudinal axis 111 of inserter body 112 when reference foot 108 is attached to rail 122. Surfaces 320 can be planar and smooth. In addition, surfaces 320 can be planar and include a texture, such as grip tape or other small protrusions, to hinder slippage of surfaces 320 on resected surface 110. The texture can help stabilize reference foot 108 during impact from a hammer or other blunt object at strike plate 118.

Surfaces 320 can also be contoured to match a bone contour that is not flat. For example, bone 104 can have a surface, such as surface 110, that is not resected or reamed to be flat, but instead has a curve. The surface topography can be planned before the surgery to allow for reference foot 108 to be manufactured, such as via 3D metal printing or other forms of rapid manufacturing, as a patient specific instrument.

Reference foot 108 can also be one of a plurality of reference feet. Each of the plurality of reference feet may be similar to reference foot 108 with the exception that surfaces 320 are arranged at different angles relative to longitudinal axis 304. Thus, after resecting or otherwise preparing surface 110 of bone 104, the surgeon can select a reference foot from the plurality of reference feet having an appropriate orientation angle.

Reference foot 108 can also include reference foot stops 322 (labeled individually as reference foot stops 322A and 322B) protruding from reference foot body 302. During use, inserter stops 124 can contact reference foot stops 322 to limit motion of inserter body 112 and rasp 102 along longitudinal axis 111. Stated another way, during rasping of bone 104, reference foot stops 322 can contact inserter stops 124 to achieve a constant depth as different sized rasps are used to prepare bone 104. In addition, when implanting a stem, reference foot body stops 322 can contact inserter stops 124 to ensure the stem is implanted at the proper depth as well as the proper orientation given that bases 318 can rest on surface 110.

As disclosed herein, reference foot stops 322 may include arrows 324 (labeled individually as arrows 324A and 324B). Arrows 324 may be engraved or otherwise etched into reference foot stops 322. As disclosed herein, arrows 322 can be placed so that they can be easily seen in either a right-hand or left-hand patient surgery. Arrows 324 appearing to be "tip-to-tip" with corresponding arrows 212 on inserter stops 124 can indicate reference foot stops 322 have engaged inserter stops 124 as disclosed herein, thereby indicating that the intended insertion depth has been reached.

FIGS. 4A-4D each shows a reference foot 400 in accordance with at least one example of this disclosure. Reference foot 400 can have a reference foot body 402 having a longitudinal axis 404, which can be parallel to longitudinal axis 111 of inserter body 112 when reference foot 400 is attached to inserter body 112. Reference foot body 400 can define a channel 405, which can be oriented parallel to longitudinal axis 404 of reference foot body 402 and sized to engage rail 122. For example, as shown in FIG. 2, rail 122 can define a groove 210. Channel 405 can include lips 406 that can ride in grooves, such as groove 210 when reference foot 400 is connected to rail 122.

A tine 408 can extend from reference foot body 402 along longitudinal axis 404 of reference foot body 402. Tine 408 can include a protrusion 410 and can be flexible. Protrusion 410, sometimes referred to as a stop or protuberance, can be sized and flex as disclosed above with respect to tine 308 to engage indentation 202 of rail 122 and secure reference foot 400 to rail 122. Inserter stop 208 can act as a stop to limit movement of reference foot 400 in a first direction and a second direction as disclosed herein with respect to tine 308.

Reference foot 400 can also include extensions 409 (labeled individually as extensions 409A and 409B) that can extend from reference foot body 402 along each side of tine 408. Extensions 409 can protect tine 408 and prevent bending or other deformation in a lateral direction.

Reference foot 408 can also include one or more arms 416 (labeled individually as arms 416A and 416B) that extend from reference foot body 402. A base 418 can be attached to arms 416 via pivots 450 (labeled individually as pivots 450A and 450B). Base 418 can include a surface 420 that is arranged at an adjustable angle θ relative to longitudinal axis 404. Since longitudinal axis 404 is parallel to longitudinal axis 111 when reference foot 400 is attached to rail 122, surfaces 420 are also arranged at an adjustable angle θ relative to longitudinal axis 111 of inserter body 112 when reference foot 400 is attached to rail 122.

To form pivots 450, arms 416 can include first holes 452 (labeled individually as first holes 452A and 452B) and base 418 can include second holes 454 (labeled individually as second holes 454A and 454B). Pins 456 (labeled individually as pins 456A and 456B) can pass though first holes 452 and second holes 456 to secure base 418 to arms 416. To allow for pivoting of base 418, first holes 452 or second holes 454 can be slightly oversized to allow pins 456 to rotate therein. To secure pins 456, second holes 454 or first holes 452 can be size to allow pins 456 to be press fitted therein.

Figure 4A:
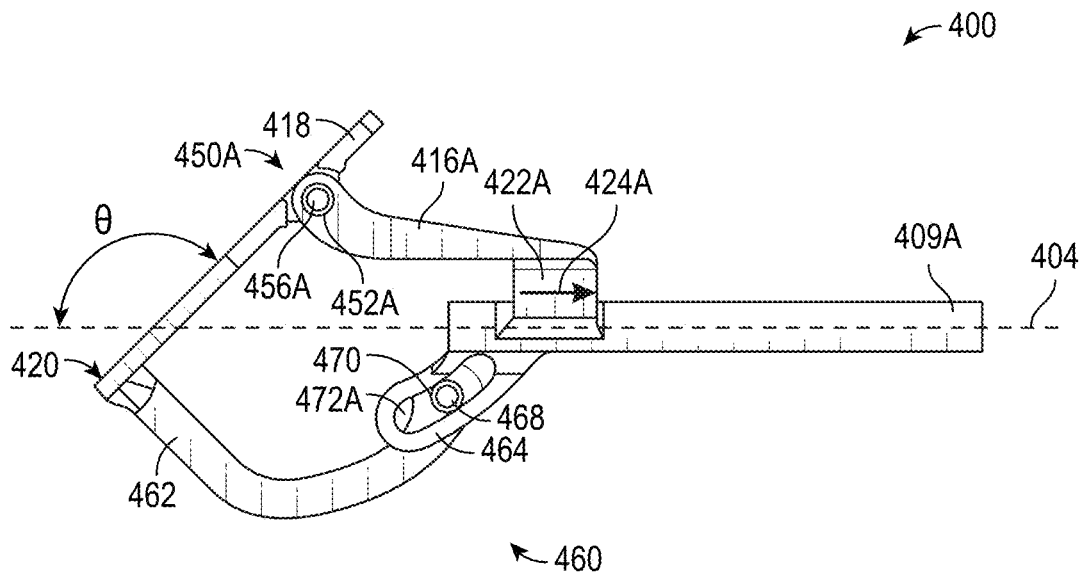
FIGS. 4A-4D each shows a reference foot in accordance with at least one example of this disclosure.
Figure 4B:
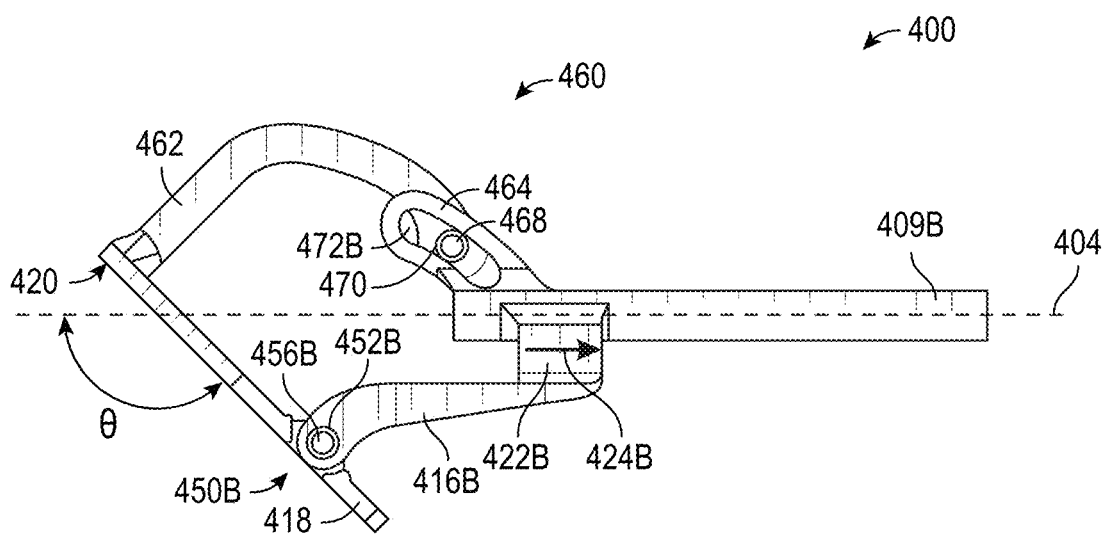
Figure 4C:
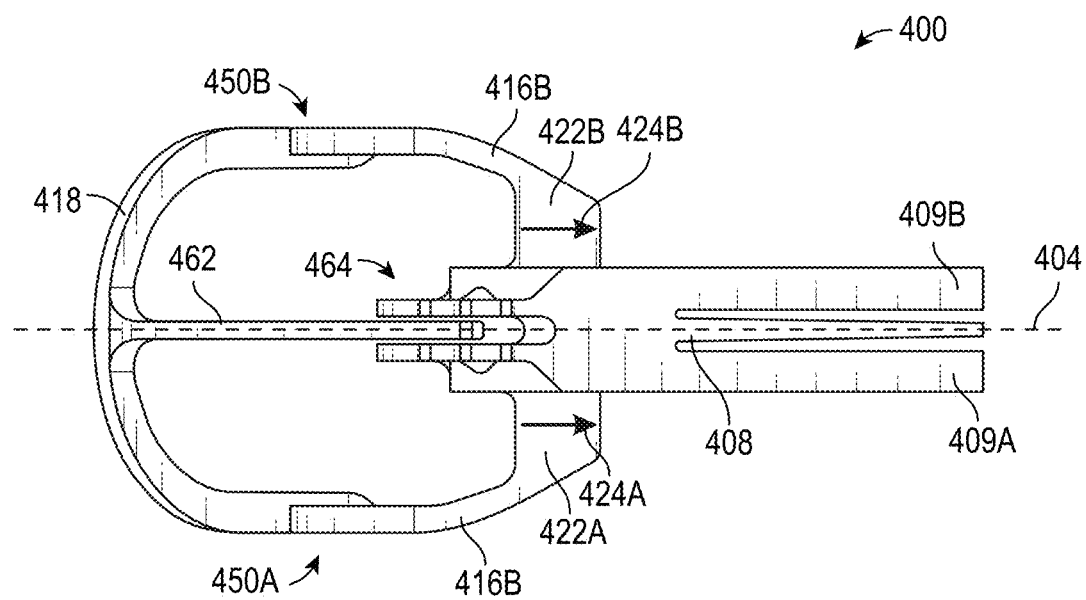
Figure 4D:
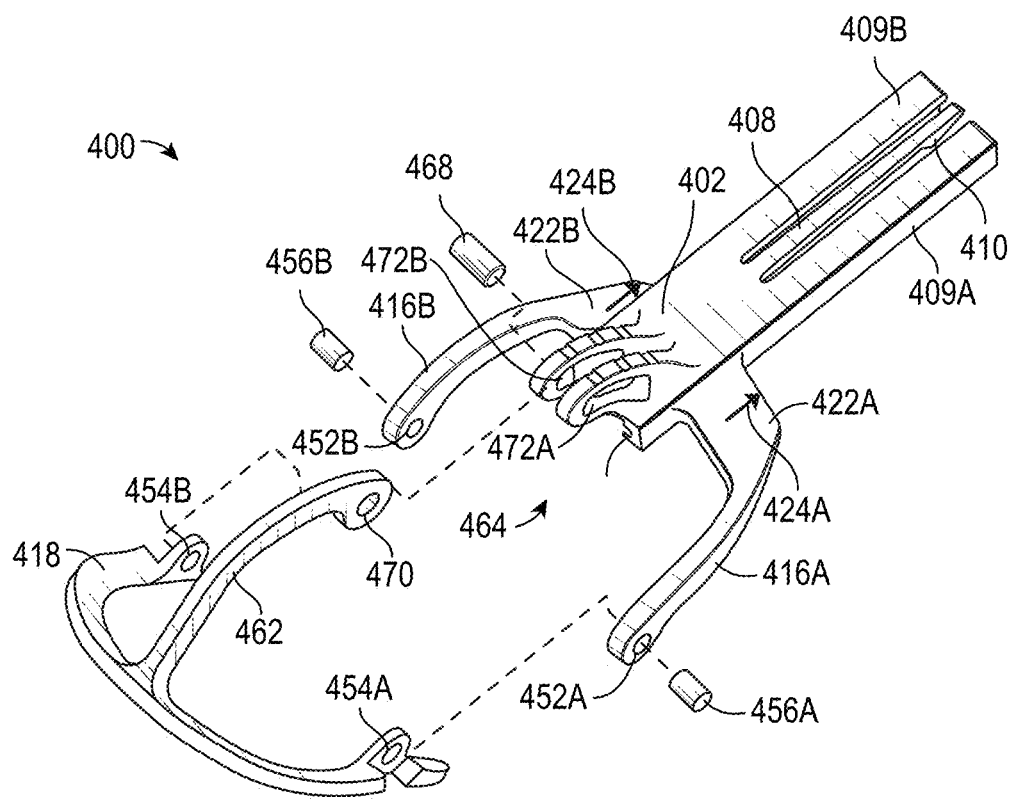

Reference foot 400 can also include an adjusting arm 460. Adjusting arm 460 can include a first portion 462 that extends from base 418 and a second portion 464 that extends from reference foot body 402. As shown in FIG. 4B, first portion 462 may fit into a slot 466 formed in second portion 464. A pin 468 may be press fitted into a hole 470 formed in first portion 462. Pin 468 may be sized to create a friction interface between pin 468 and elongated holes 472 (labeled individually as elongated holes 472A and 472B) thereby securing base 418 at different angles relative to longitudinal axis 404. Other devices can also be used to help secure the position of base 418. For example, elongated holes 472 may include bushing or other materials to increase friction between pin 468 and interior surfaces of elongated holes 472. In other examples, set screws or other fixation devices can be used, in place of or in addition to a friction fit, to secure base 418 at a desired angle relative to longitudinal axis 404.

As disclosed herein, surface 420 can be planar and smooth, planar and textured, contoured and smooth, contoured and textured, etc. as disclose herein with respect to surfaces 320. The surface topography can be planned before the surgery to allow for reference foot 400 to be manufactured, such as via 3D metal printing or other forms of rapid manufacturing, as a patient specific instrument.

Reference foot 400 can also include reference foot stops 422 (labeled individually as reference foot stops 422A and 422B) protruding from reference foot body 402. During use, inserter stops 124 can contact reference foot stops 422 to limit motion of inserter body 112 and rasp 102 along longitudinal axis 111. In addition, when implanting a stem, reference foot body stops 422 can contact inserter stops 124 to ensure the stem is implanted at the proper depth as well as the proper orientation given that base 418 can rest on surface 110.

As disclosed herein, reference foot stops 422 may include arrows 424 (labeled individually as arrows 424A and 424 B). Arrows 424 may be engraved or otherwise etched into reference foot stops 422. As disclosed herein, arrows 422 can be placed so that they can be easily seen and when appearing to be "tip-to-tip" with corresponding arrows 212 on inserter stops 124 can indicate reference foot stops 422 have engaged inserter stops 124 as disclosed herein with respect to reference foot stops 322, thereby indicating that the intended insertion depth has been reached.

Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and"wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A reference foot comprising:
a body having a longitudinal axis, the body defining an engagement fixture sized to receive a complementary fixture of an inserter;
a tine extending from the body along the longitudinal axis and including a protuberance sized to engage a stop of the inserter;
a first arm extending from the body; and
a first base attached to the first arm and having a planar surface arranged at an angle relative to the longitudinal axis,
wherein the first base is rotatably attached to the first arm such that the angle relative to the longitudinal axis is adjustable.

2. The reference foot of claim 1, further comprising at least one stop protruding from a portion of the body, the at least one stop sized to engage a corresponding stop of the inserter so as to limit movement of the reference foot relative to the body in a first direction.

3. The reference foot of claim 1, wherein the protuberance of the tine comprises:
a first surface arranged at a first angle relative to the longitudinal axis; and
a second surface arranged at a second angle relative to the longitudinal axis, the first angle being larger than the second angle.

4. The reference foot of claim 1, wherein the tine is flexible.

5. The reference foot of claim 1, wherein the engagement fixture includes a channel sized to receive a rail portion of the inserter.

6. The reference foot of claim 1, further comprising:
a second arm extending from the body; and
a second base attached to the second arm and having a planar surface arranged at the angle relative to the longitudinal axis.

7. A system for rasping a bone, the system comprising:
an inserter comprising:
an inserter body having a longitudinal axis, and
a first engagement fixture arranged parallel to the longitudinal axis of the inserter body and including an inserter stop; and
a reference foot comprising:
a reference foot body having a longitudinal axis, the reference foot body defining a second engagement fixture oriented parallel to the longitudinal axis of the reference foot body and sized to engage the first engagement fixture of the inserter,
a tine extending from the body along the longitudinal axis of the reference foot body and including a tine protuberance sized to engage the inserter stop, wherein the tine protuberance comprises:
a first surface arranged at a first angle relative to the longitudinal axis, and
a second surface arranged at a second angle relative to the longitudinal axis, the first angle being larger than the second angle, and
the inserter stop comprises complementary first and second angles,
a first arm extending from the reference foot body, and
a first base attached to the first arm and having a planar surface arranged at an angle relative to the longitudinal axis of the reference foot body.

8. The system of claim 7, wherein
the inserter includes an inserter stop projecting from the inserter body; and
the reference foot includes a reference foot stop protruding from the reference foot body,
the inserter stop and the reference foot stop cooperative to limit movement of the reference foot relative to the inserter body in a first direction along the longitudinal axis of the inserter.

9. The system of claim 7, wherein the tine is flexible.

10. The system of claim 7, wherein the first engagement fixture includes a rail portion and the second engagement fixture includes a channel sized to receive the rail portion.

11. The system of claim 7, wherein the first base is rotatably attached to the first arm such that the angle relative to the longitudinal axis of the reference foot is adjustable.

12. The system of claim 7, wherein the reference foot further comprises:
a second arm extending from the body; and
a second base attached to the second arm and having a planar surface arranged at the angle relative to the longitudinal axis of the reference foot.

13. The system of claim 7, wherein the reference foot is one of a plurality of reference feet, the angle of each of the reference feet being different than others of the plurality of reference feet.

14. A system for reaming a bone, the system comprising:
a rasp;
an inserter comprising:
an inserter body having a first end, a second end, and a longitudinal axis extending from the first end to the second end, the first end operable to engage the rasp, the second operable to engage a strike plate,
a rail arranged parallel to the longitudinal axis of the inserter body and including an indentation, and
an inserter stop projecting from the inserter body; and
a reference foot comprising:
a reference foot body having a longitudinal axis parallel to the longitudinal axis of the inserter body when the reference foot is attached to the inserter, the reference foot body defining a channel oriented parallel to the longitudinal axis of the reference foot body and sized to engage the rail of the inserter, a tine extending from the body along the longitudinal axis of the reference foot body and including a protrusion sized to engage the indentation of the rail of the inserter, a first arm extending from the reference foot body, a first base attached to the first arm and having a planar surface arranged at an angle relative to the longitudinal axis of the reference foot body, a second arm extending from the body, a second base attached to the second arm and having a planar surface arranged at the angle relative to the longitudinal axis of the reference foot, and a reference foot stop protruding from the reference foot body, wherein the inserter stop and the reference foot stop cooperative to limit movement of the reference foot relative to the inserter body in a first direction along the longitudinal axis of the inserter, and wherein the first base is rotatably attached to the first arm such that the angle relative to the longitudinal axis of the reference foot is adjustable.

15. The system of claim 14, wherein the tine is flexible.

16. The system of claim 14, wherein

The protrusion of the tine comprises:

a first surface arranged at a first angle relative to the longitudinal axis, and a second surface arranged at a second angle relative to the longitudinal axis, the first angle being larger than the second angle, and the inserter stop comprises complementary first and second angles.

17. The system of claim 14, wherein the reference foot is one of a plurality of reference feet, the angle of each of the reference feet being different than others of the plurality of reference feet.

* * * * *